United States Patent [19]

Hernandez et al.

[11] Patent Number: 4,962,475
[45] Date of Patent: Oct. 9, 1990

[54] METHOD FOR GENERATING A DOCUMENT UTILIZING A PLURALITY OF WINDOWS ASSOCIATED WITH DIFFERENT DATA OBJECTS

[75] Inventors: Irene H. Hernandez; Rex A. McCaskill, both of Austin, Tex.

[73] Assignee: International Business Machines Corporation, Armonk, N.Y.

[21] Appl. No.: 168,368

[22] Filed: Mar. 15, 1988

Related U.S. Application Data

[63] Continuation of Ser. No. 686,565, Dec. 26, 1984, abandoned.

[51] Int. Cl.5 .............................................. G06F 3/153
[52] U.S. Cl. ................................... 364/900; 364/943; 364/943.43; 364/927.63; 364/927.62; 364/521; 340/721; 400/76
[58] Field of Search ... 364/200 MS File, 900 MS File, 364/518, 521, 419; 400/63, 76; 340/724, 726, 721

[56] References Cited

U.S. PATENT DOCUMENTS

| | | | |
|---|---|---|---|
| 4,414,628 | 11/1983 | Ahuja et al. | 364/200 |
| 4,428,065 | 1/1984 | Duvall et al. | 364/900 |
| 4,470,129 | 9/1984 | Disbrow et al. | 364/900 |
| 4,559,598 | 12/1985 | Goldwasser et al. | 364/900 |
| 4,598,384 | 7/1986 | Shaw et al. | 364/900 |
| 4,611,202 | 9/1986 | Di Nitto et al. | 340/724 |
| 4,688,167 | 8/1987 | Agarwal | 364/200 |
| 4,713,754 | 12/1987 | Agarwal et al. | 364/200 |

FOREIGN PATENT DOCUMENTS 59-125425  7/1984  Japan .................................. 340/721

Primary Examiner—Thomas C. Lee
Attorney, Agent, or Firm—James H. Barksdale, Jr.; H. St. Julian; Casimer K. Salys

[57] ABSTRACT

A method for tailoring a master document to obtain a special document. The master document is made up of data objects and portions of the data objects. Included in the portions are pointers to corresponding data objects. The portions are windowed and displayed. Selection of a window will result in a view port being opened through the window into a corresponding data object. The data object can then be scrolled to obtain a desired portion to be included in the special document. As each desired portion is obtained, it is stored and becomes part of the special document.

5 Claims, 5 Drawing Sheets

METHOD FOR GENERATING A DOCUMENT UTILIZING A PLURALITY OF WINDOWS ASSOCIATED WITH DIFFERENT DATA OBJECTS

This is a continuation of application Ser. No. 686,565 filed Dec. 26, 1984, now abandoned.

CROSS-REFERENCE TO RELATED APPLICATION

U.S. Pat. application Serial No. 686,519, filed Dec. 26, 1984, entitled DOCUMENT CREATION, and having I.H. Hernandez et al, as inventors, now U.S. Pat. No. 4,663,615.

TECHNICAL FIELD

This invention relates generally to document editing, and more specifically to a method of, and system for, specially tailoring a master document.

BACKGROUND ART

Document tailoring or new document creation utilizing a master document as a basis has up to now been a batch, cut and paste, etc., type of editing operation. An operator using an application driven device controlled display standalone, or host connected, computer work station or system today can cause the master document to be loaded into memory from a disk, and begin displaying and scroll through the document. Undesired portions can be deleted and desired portions can be edited. On paper, this sounds simple and straightforward. However, much attention, time, and keying are required. A single character can be deleted with very few keystrokes, but paragraphs must be cursored and bracketed prior to deletion.

To aid in document tailoring, split screen facilities or application programs are available for viewing and comparing various portions of the master document in a side-by-side manner. In using these facilities, one can, for example, create two view ports and cause one portion to be displayed on the top half of a display screen and a different portion to be displayed on the bottom half of the screen. Side by side viewing is also possible. In addition, capabilities have been provided to further divide the screen. Commonly, on the first division the screen is divided into halves, on the second division the screen is divided into fourths, etc.

In recent times, windowing systems or applications have become popular. Different portions of a document can be reviewed and compared, but separate windows must be created. Creating separate windows requires operator time, effort, and attention. In addition, to meet as many operator wants or needs as possible, users have increased the applications' capability to the extent that windows can be increased or decreased in size. This can be for purposes of either magnification or increasing the size of the portion of the document being viewed.

Whether using standard editing approaches, split screens, or windowing applications, absent has been a flexible and user friendly interface for readily creating a tailored document.

From the above, a tailored document can be created. However, clear deficiencies exist, and these deficiencies cause the prior art to fall short of either anticipating the instant invention or rendering the instant invention obvious. More specifically, the instant invention presents an advance over prior art systems, applications, and techniques in that an operator can readily select various portions of a master document and build a document for a specialized need. Building is from a plurality of windowed portions of the master document displayed on a screen at the same time. Each window provides a view port into a portion of the master document and the portion can be scrolled in the window to select what is to be included in the tailored document. The windows are system generated and are used to automatically bracket information or data which an operator desires to be included in the tailored document. The advantages of this advance are reduced operator attention, keying, and confusion.

DISCLOSURE OF THE INVENTION

A unique method for building a specially tailored document from a master document are provided to improve user friendliness and system flexibility, and reduce operator attention. Given a master document made up of data objects and stored along with a corresponding collection of portions of the data objects, the portions can be individually windowed and displayed to an operator. When a portion is selected, a view port is created into a corresponding data object. The data object can then be scrolled in the view port formed by the window for obtaining a desired portion of the data object for inclusion in the tailored document.

BEST MODE FOR CARRYING OUT THE INVENTION

General Overview and Definitions

Figure 1:
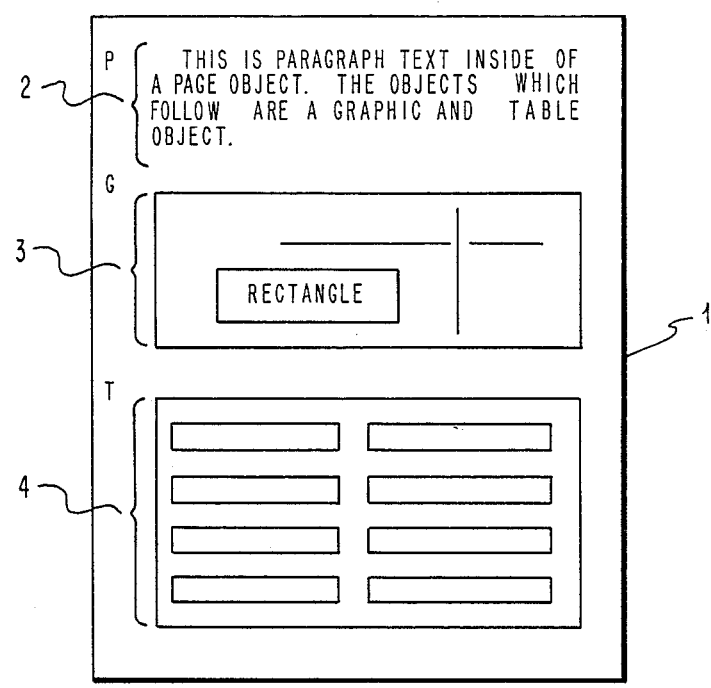
FIG. 1 illustrates a document previously edited with multiple data objects on the page.

As a preferred embodiment, the instant invention will be packaged as, or included in, an application program. For purposes of conciseness, application program will be abbreviated to application hereinafter. The application will have been written by a user or programmer for use in either a word processing or computing system operable by an operator. The systems contemplated include standalone and host connected device controlled display work stations. The system display will preferably be of an all-points-addressable (APA) cathode ray tube (CRT) type. The face of the display will be referred to as a screen. When a window is created, only a portion of the screen will be occupied by the window which will generally be bordered. When created, a window of default size will be presented to the operator. The window can thereafter be moved, and either enlarged or diminished in size. As a practical matter, the window can be varied in size from very small up to a point that it fills the entire screen. Window manipulation in terms of locating and sizing on the screen, as a broad concept, is well known and forms no part of the instant invention. The term document is meant to include storable and retrievable information. The information can be in the form of text, graphics, tables, etc., which will be referred to hereinafter as data types.

Device control includes control of the display by a keyboard, joy stick, light pen, mouse, scratch pad, etc., or any combination of such devices. By system control is meant hardware and/or software control of the system.

For the following detailed description, it is to be assumed that at the beginning of operation for creating the master document, a menu is presented to the operator. The operator can select a data type such as a graphic object, table, etc., along with other parameters such as margin settings, etc., by keying to the menu. Keying to the menu results in a data object being defined or specified. Upon completion of keying to the menu, the system will cause a window to be built on the screen into which data can be input. The data input into the window can be much larger than the window. For example, if a text data object has been specified for one portion of the document to be built, the text input into the window can be several physical pages long. Handling of the excess text is by scrolling in the window during input. Compared to the window size, the text can be many times larger. Upon completion of input of the data object or portion of the document being built, the menu is recalled. A different data object can then be specified. Upon completion of defining this new data object, the system will cause another window to be built on the screen below the previous window. At this time, displayed in the previous window will be the last part of the data input up to window size limitations. Ultimately, the screen will be filled with windows. When this occurs and a new data object is specified, the system will cause the windows already on the screen to be scrolled to provide room for another window.

Each data object created in the above manner is stored in order of creation. The windowed data at the completion of input is also stored in the order the windows are created. Stored along with each of the windowed data is a pointer to a corresponding data object.

At the beginning of operation for purposes of the following description, a plurality of windows containing the windowed data are called and displayed on the screen. When one of the windows is selected, a view port is opened through the window into the corresponding data object. The view through the view port is of the same data windowed in the window prior to selection. Thereafter, the data object can be scrolled in the selected window for selecting a desired portion of the data object for inclusion in the document being tailored from the master document which is made up of the data objects.

Selection of the window can be by means of a mouse controlled pointing cursor and a select button on the mouse. Selection of a portion of the data object for inclusion in the tailored document can also be by mouse button depression. The extent of selection of a portion of the data object is defined by the window size. This avoids normal bracketing and defining operations.

DETAILED DESCRIPTION

For a more detailed understanding of the invention, it is to be assumed that use is of a standalone keyboard/display computing system such as an IBM Personal Computer configured with a keyboard, an APA display, a black and white monitor, a graphics adaptor, a disk drive, an operating system, a mouse, sufficient working memory, and diskettes containing the master document and an application containing the instant invention. Further assume the system has been powered on, etc., and that the application of this invention has been loaded and is running.

Reference is now made to FIG. 1. In this figure there is illustrated a screen 1. When the operator begins an editing session and specifies a document to be edited which was created previously, the application displays the data objects of the document within on screen 1. Text data object 2, graphic data object 3, and table data object 4 represent the data objects contained within the document.

Figure 2:
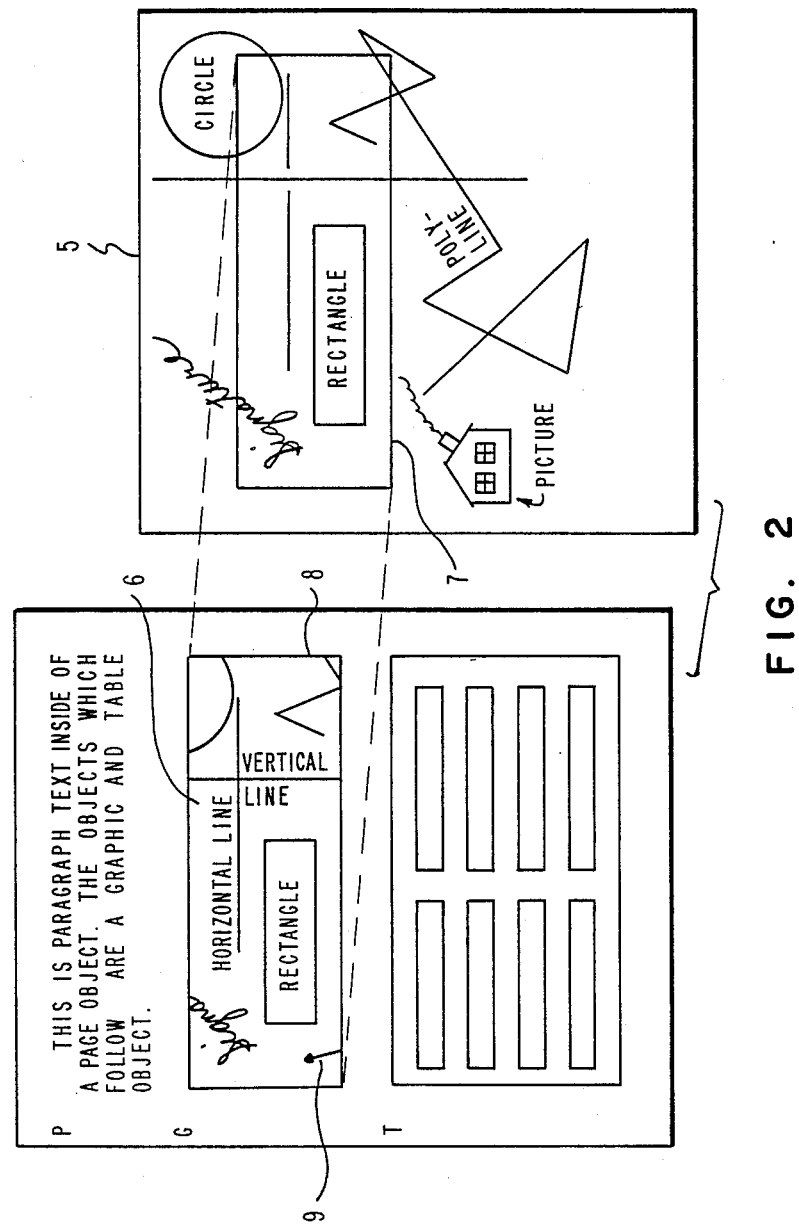
FIG. 2 illustrates a view of the entire data area of a data object which is not all visible within the object window.

Referring to FIG. 2, data area 5 represents the entire data belonging to the data object 6. Only the portion 7 is currently visible through object window 8. When operation is within the window, the point of operation can be denoted by a cursor 9. As cursor 9 is moved by a device, the point of operation is moved. The device can be a mouse, keyboard, joystick, etc. The particular characteristics of cursor 9 are unimportant as far as this invention is concerned. That is, the cursor could be a standard textual type cursor, etc. Cursor location and movement are directly related to editing. Editing encompasses insertion, deletion, replacement, etc., operations. Cursor 9 as shown in FIG. 2 denotes the data object selected and to be scrolled.

When the operator performs a scrolling action of the data within object window 8, the contents within object window 8 will scroll. The effects of this action will result in the operator viewing a different portion of the data within the window.

Figure 3:
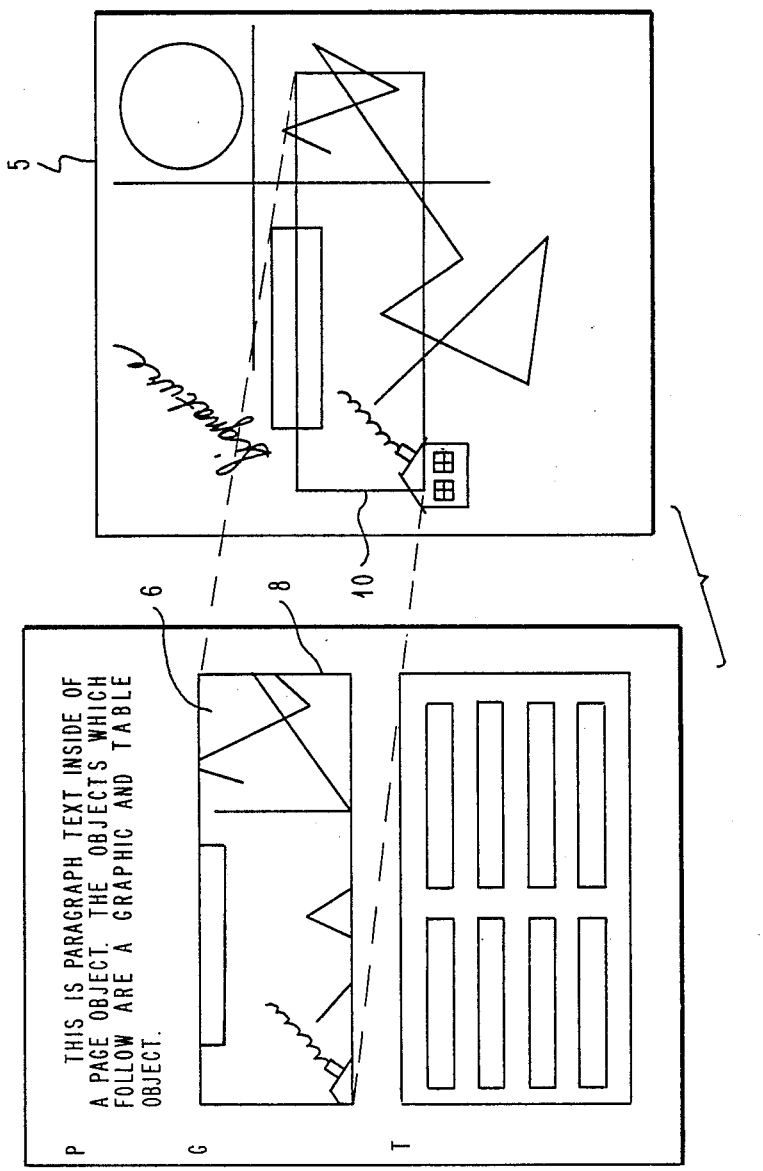
FIG. 3 illustrates the results of scrolling the data within the object window to view different data.

FIG. 3 represents the data object 6 following operator scrolling. Object window 8 is displaying the data represented by portion 10. The entire data belonging to the object resides in data area 5. Next, the operator requests that the size of the object window 8 be increased to allow more of the data in the data area 5 to be viewed.

Figure 4:
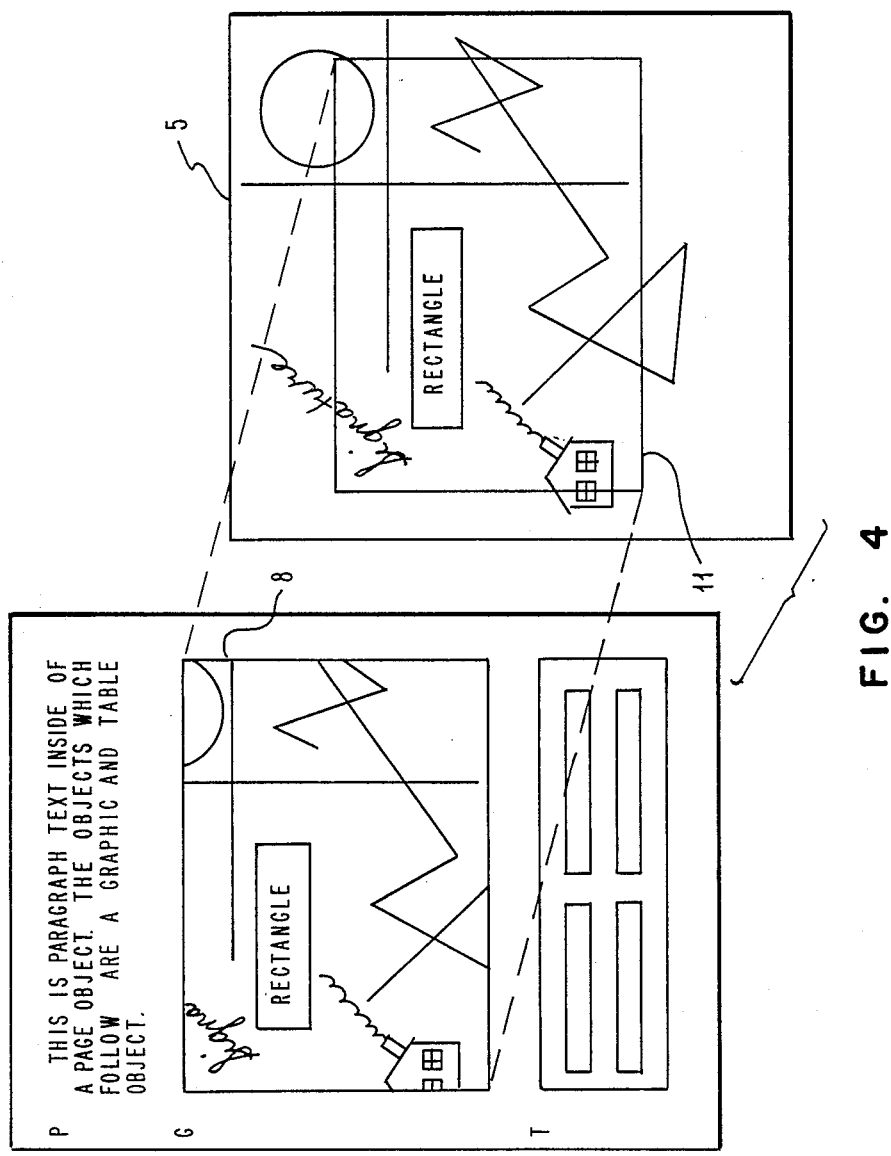
FIG. 4 illustrates enlarging the window to view more data in the data area.

Referring to FIG. 4, object window 8 has been increased in size to accommodate more data from the data area 5. The portion viewed through window 8 is represented by portion 11.

Set out below is an illustration of an application program useable by a process or in the workstation or host for tailoring a master document according to this invention. This program is in program design language from which source and object code are derivable.

```
CALL GET_DOC_DATA (DOC_OBJECT_PTR, DOC_NAME)
CALL ALLOCATE_DOC_WINDOW (DOC_WINDOW_PTR, DOC_OBJECT_PTR)
CALL SET_DOC_VIEW(DOC_WINDOW_PTR, OBJECT_PTR)
REPEAT
CALL MONITOR_INPUT (SELECT_KEY_TYPE, X, Y)
IF ACTION_OCCURRED THEN
CASE COMMAND_TYPE OF
CREATE_OBJECT:
CALL GET_OBJECT_ATTRIBUTES(OBJECT_ATTRIBUTES)
CALL CREATE_OBJECT (OBJECT_PTR, OBJECT_ATTRIBUTES)
```

```
-continued
CALL REDISPLAY_DOC (OBJECT_PTR)
SIZE_WINDOW:
CALL SET_OBJECT_ATTRIBUTES(WINDOW_SIZE, OBJECT_PTR)
CALL REDISPLAY_DOC (OBJECT_PTR)
OTHER_ACTIONS:
CALL PROCESS_COMMAND (COMMAND_TYPE, OBJECT_PTR)
ENDCASE
ELSE
IF DATA_OBJECT_EDIT THEN
CALL GET_WINDOW_PTR(X, Y, WINDOW_PTR, DATA_AREA_PTR)
CALL GET_AREA_TYPE (DATA_AREA_PTR, AREA_TYPE)
CASE AREA_TYPE OF
DRAW_GRAPHIC: CALL_EDIT_DRAW (WINDOW_PTR, DATA_AREA_PTR)
BUS_GRAPHIC: CALL EDIT_BUS (WINDOW_PTR, DATA_AREA_PTR)
TABLE: CALL_EDIT_TABLE (WINDOW_PTR, DATA_AREA_PTR)
TEXT: CALL_EDIT_TEXT (WINDOW_PTR, DATA_AREA_PTR)
ENDCASE
ELSE
IF SCROLL_MODE THEN
CALL GET_SCROLL_MODE_TYPE (SELECT_KEY_TYPE, SCROLL_MODE_TYPE)
CASE SCROLL_MODE_TYPE OF
OBJECT_WINDOW:
CALL GET_WINDOW_PTR(X, Y, WINDOW_PTR, DATA_AREA_PTR)
CALL GET_SCROLL_AMT (WINDOW_PTR, DATA_AREA_PTR, X, Y,
SCROLL_AMT)
REPEAT
CALL SET_WINDOW_VIEW(WINDOW_PTR, DATA_AREA_PTR, SCROLL_AMT,
SCROLL_COMPLETE)
IF NOT SCROLL_COMPLETE THEN
CALL GET_DATA (OBJECT_PTR, DATA_AREA_PTR, NO_MORE_DATA)
ENDIF
UNTIL SCROLL_COMPLETE OR NO_MORE_DATA
CALL SET_CURSOR_LOCATION (WINDOW_PTR, CURSOR_LOCATION)
CALL SAVE_WINDOW_VIEW (WINDOW_PTR, OBJECT_PTR)
DOCUMENT:
CALL SET_DOC_VIEW (DOC_WINDOW_PTR, OBJECT_PTR)
ENDCASE
ENDIF
ENDIF
ENDIF
UNTIL EDIT_COMPLETE
```

When the application program initiates an editing session, a routine is called to generate the internal structure of the document (CALL GET_DOC_DATA). If a new document is being created by the operator, an empty document structure is created. If a document already exists, the structure of the document will consist of all the data objects created by the operator in a previous editing session. When the document structure is complete, the application calls a routine to allocate a 'parent' document window (CALL ALLOCATE_DOC_WINDOW) and then calls a routine to prepare the data objects to be displayed on the screen (CALL SET_DOC_VIEW). A pointer to the object which should be displayed at the top of the screen is input to this routine. This routine traverses through the document structure looking for data objects. For each object in the structure, the routine interfaces with the windowing system to allocate a window ('a child window of the parent') and a data area. The data area is a buffer which contains all the information pertaining to a data object. The routine translates the object data into the data area. The allocated window is of a fixed size defined by the operator or system at the time the object was edited last. The allocated window may also be smaller than the data in the object's data area. A link is maintained between the data object and its respective window and data area. Information about the positions of the objects on the page are also maintained. This routine will translate enough data objects necessary to generate a screen full of information. When all translation necessary has occurred, the routine displays the data on the physical screen. The application, upon completion of displaying the document, enters a state in which the movement of the pointing cursor is being monitored for editing purposes.

As the application monitors input from the operator (CALL MONITOR_INPUT) several operator actions may occur. If an action occurred (e.g., move, copy, delete), the application calls a routine to process the command (CALL PROCESS_COMMAND). If the operator specifies that a data object is to be created, the application gets the data object's attributes such as window height and margins by calling a routine (CALL GET_OBJECT_ATTRIBUTES). The application then creates a data object internally and links the data object into the document structure. The placement of the created data object within the document structure is dependent on the selected location in the document where the operator requested the creation of the data object. The data object will be linked following the last data object at the selected location. After the data object is created, the application calls a routine (CALL REDISPLAY_DOC) to display an updated view of the document contents. This routine determines that a new object has been created, and that a window and data area do not exist for the object and will create them. The placement of the object in relation to the other objects in the document are maintained.

If the operator requested that the size of the data object's window be adjusted (either increased or decreased), the application calls a routine to set the window attributes of the selected data object in the document structure (CALL SET_OBJECT_ATTRIB- UTES). The application then calls a routine (CALL REDISPLAY_DOC) to redisplay the updated view of the document contents, and the new size of the data object's window will be reflected.

If the operator action to occur is to edit the data within the data object's window, a routine is called to determine which data object window and associated data area is to be edited (CALL GET_WINDOW_PTR). Depending on the type of data (CALL GET_AREA_TYPE) in the data object's window, a routine is called to handle the creation and editing process for the type of data. A routine (CALL EDIT_DRAW) is called if draw graphics data is to be created or edited. A routine (CALL EDIT_BUS) is called if business graphics data is to be created or edited. A routine (CALL EDIT_TABLE) is called if table data is to be created or edited. A routine (CALL EDIT_TEXT) is called if text data is to be created or edited. The edit routines are responsible for inserting the data into the objects data areas as data input occurs and for issuing a redisplay of the changed data object contents. The routines also monitor when the data has reached the window boundary so that information scrolling can occur. Upon completion of editing the data object, the application will remember the last view of the data as shown within the data object's window.

If the operator action which occurred is scrolling of the data, the application determines what type of scrolling is to occur (CALL GET_SCROLL_MODE_TYPE). If scrolling of the object's data area within the window is to occur, a routine is called to determine which data object window and associated data area is to be scrolled (CALL GET_WINDOW_PTR). A routine is then called to determine how much of the data to scroll (CALL GET_SCROLL_AMT). Once the scroll amount has been determined, a routine is called to reset the view of the data within the object's window (CALL SET_WINDOW_VIEW). If it is determined from the call to SET_WINDOW_VIEW that not enough data exists within the data area to complete the scrolling process, a routine is called (CALL GET_DATA) to fetch more data into the data area. The scrolling is complete when the specified scroll amount has been reached or no more data exists for the object (UNTIL SCROLL_COMPLETE OR NO_MORE_DATA) The cursor location is updated (CALL SET_CURSOR_LOCATION) and a routine is called (SAVE_WINDOW_VIEW) to save the current view of the data within the window. If the type of scrolling to occur is document scrolling, normal scrolling of the document (CALL SET_DOC_VIEW) will occur. The view of the data object within the data objects windows are locked and will not change as the document is scrolled. The view of the data within the object's window is remembered when the call to SAVE_WINDOW_VIEW was made as defined above. If the operator elects to terminate the editing session or scroll the data object back into view, the last view within the data object's window is what is displayed.

The application continues to monitor input until the editing session is complete (UNTIL EDIT_COMPLETE). When the editing session is complete, all data within the data object's view ports are stored within the document.

Figure 5:
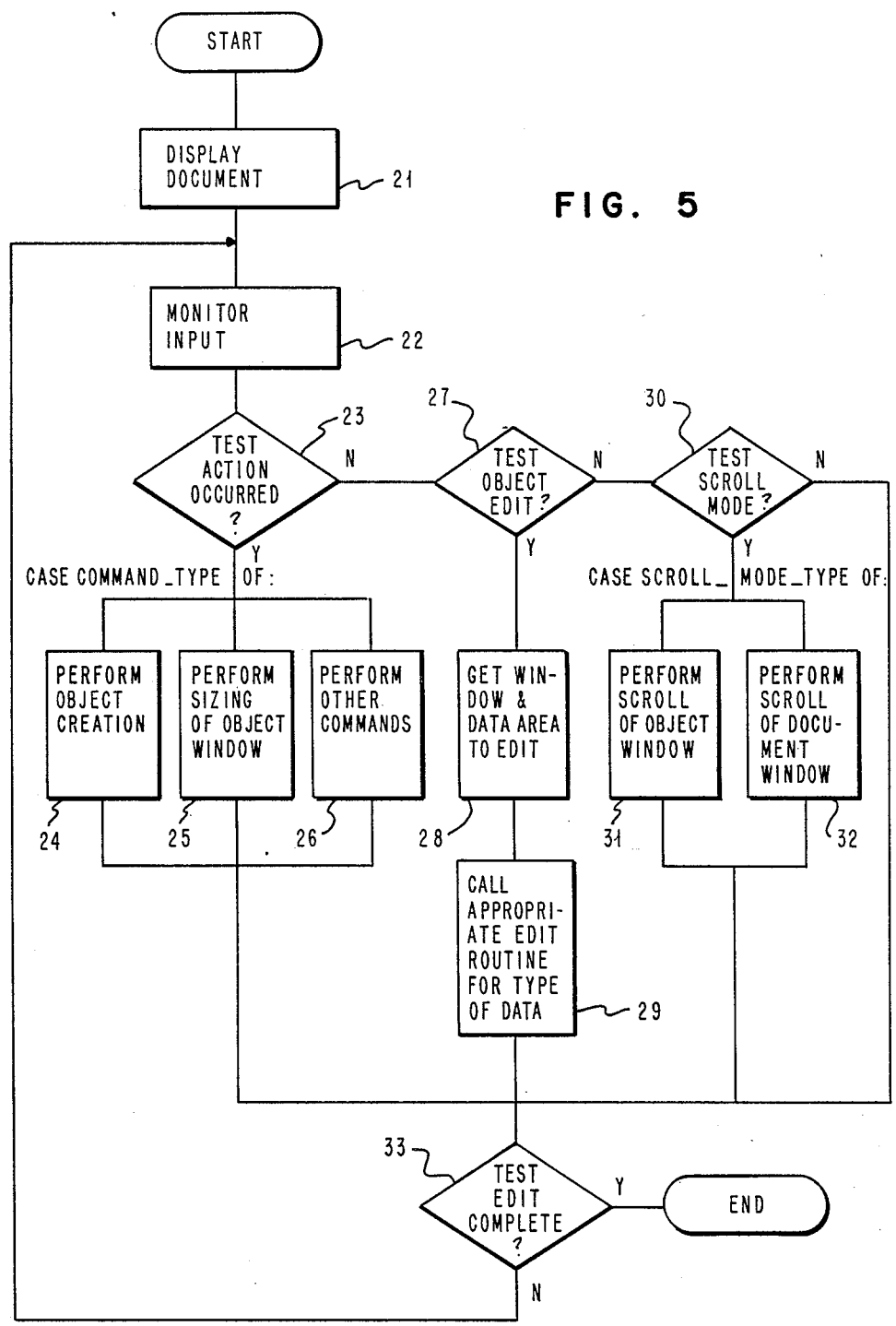
FIG. 5 illustrates operations performed in tailoring a master document.

Reference is next made to the flow chart of FIG. 5 which illustrates operations performed in tailoring a master document according to this invention.

First, the application initiates the editing session and invokes routines to generate the internal document structure and to display the document data as represented by block 21. Displaying the document involves creating windows and data areas for each object within the document structure. If the document did not exist previously, an empty document is displayed. If the document did exist, a screen full of data information is generated and displayed on the screen. Upon displaying the initial view of the document on the screen, the application is ready to monitor operator input as depicted in block 22. If the input received is to execute an action as shown in block 23, the application determines what type of action occurred. If the operator requested that an object is to be created, the application creates the data object internally, creates the data object's window, and displays the data object on the screen. The process of object creation is shown in block 24. If the operator requested that the size of the data object's window be changed (either increased or decreased), the operator specifies the new size and the application adjusts the size of the object's window. The sizing of the window is shown in block 25. The application will show as much data as will fit within the new window size. If any other actions occur, the application executes those actions as shown in block 26. If an action did not occur, the application determines if object editing is to occur as shown in block 27. If object editing is to occur, the application obtains information about the selected data object's window and data area as shown in block 28, and calls the appropriate edit routine to create/edit the data as depicted in block 29. If object editing is not occurring, the application determines if a scrolling action is to occur as shown in block 30. If a scrolling action is to occur, the application determines what type of scrolling is to take place. If scrolling of the data object is to occur, the application determines the amount of data to scroll, then scrolls that amount of data within the object's window as depicted in block 31. If scrolling of the document is to occur, the application scrolls the document maintaining the view of the data within the object windows as depicted in block 32. The application continues to monitor operator input until editing is complete as shown in block 33.

In summary, a unique method for building a specially tailored document from a master document are provided to improve user friendliness and system flexibility, and reduce operator attention. Portions of data objects making up a master document are windowed and displayed to an operator. When a portion is selected, a view port is created into a corresponding data object. The data object can then be scrolled in the view port for obtaining a desired portion of the data object for inclusion in the special document.

While the invention has been particularly shown and described with reference to a preferred embodiment, it will be understood by those skilled in the art that various changes in form and detail may be made without departing from the spirit and scope of the invention.

What is claimed is:

1. In a computer system having a display screen, a method of generating a tailored document from data objects making up a master document within said computer system, said method comprising the steps of:
   (a) generating, responsive to operator control, computer system signals to display a portion of a plurality of said data objects of said master document in a plurality of windows on said display screen, respectively, with different portions in each of said plurality of windows thereby forming view ports into each of said plurality of data objects when selected;

(b) generating, responsive to operator control, computer system signals to scroll said portion of a selected one of said plurality of data objects in one of said plurality of windows corresponding thereto to position a desired portion of said selected one of said plurality data objects viewable in said one of said plurality of windows for inclusion in said tailored document;

(c) repeating step (b) until a desired portion of each of the remaining ones of said plurality of data objects is positioned within a respective one of said plurality of windows; and (d) generating, responsive to operator control, computer system signals to include each desired portion of said plurality of the respective data objects in said tailored document stored in said computer system upon a termination of the display of said plurality of windows while maintaining a link between said desired portions and said master document.

2. A method according to claim 1 including a displaying data object portions in the same order as data objects making up said master document are prepared.

3. A method according to claim 1 including scrolling said windows to obtain another selectable window.

4. In a computer system having a display screen, a method of generating a tailored document from a collection of data objects making up a master document and a corresponding collection of portions of said data objects within said computer system, said method comprising the steps of:

(a) generating, responsive to operator control, computer system signals to window a plurality of said portions of said master document and displaying said plurality on said display screen;

(b) generating, responsing to operator control, computer system signals to select one of said displayed portions for creating a view port into a corresponding data object;

(c) generating, responsive to operator control, computer system signals to scroll said corresponding data object in said view port to obtain a desired portion of said corresponding data object positioned within said view port for inclusion in said tailored document;

(d) generating, responsive to operator control, computer system signals to store said desired portion in said computer system to build said tailored document within said computer system in response to the selection of another one of said displayed portions; and (e) generating, responsive to operator control, computer system signals to include each desired portion of said collection of data objects in said tailored document in the order each of said desired portions is stored upon a termination of the display of said plurality of said portions.

5. A method according to claim 4 including scrolling said corresponding collection of portions for windowing and displaying a subsequent one of said corresponding collection of portions.

* * * * *